US008668245B2

(12) United States Patent
Kakiuchi et al.

(10) Patent No.: US 8,668,245 B2
(45) Date of Patent: Mar. 11, 2014

(54) FRONT UNDERFLOOR STRUCTURE OF VEHICLE

(75) Inventors: Takeshi Kakiuchi, Fujisawa (JP); Masahiro Ataka, Ebina (JP); Youhei Ogawa, Atsugi (JP); Kazuaki Nakajima, Yokohama (JP); Yuji Ishihara, Zushi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/639,220

(22) PCT Filed: Apr. 7, 2011

(86) PCT No.: PCT/JP2011/058837
§ 371 (c)(1),
(2), (4) Date: Oct. 4, 2012

(87) PCT Pub. No.: WO2011/126084
PCT Pub. Date: Oct. 13, 2011

(65) Prior Publication Data
US 2013/0026790 A1  Jan. 31, 2013

(30) Foreign Application Priority Data

Apr. 8, 2010 (JP) ................................. 2010-089339

(51) Int. Cl.
*B62D 35/02* (2006.01)
(52) U.S. Cl.
USPC ........ 296/180.1; 296/204; 296/208; 180/69.1
(58) Field of Classification Search
USPC .............. 296/180.1, 38, 193.07–193.09, 208, 296/204, 181.1–181.2; D12/181; 180/69.1
See application file for complete search history.

(56) References Cited

U.S. PATENT DOCUMENTS

| 3,331,627 | A | * | 7/1967 | Schroder et al. | 296/181.2 |
| 3,419,310 | A | * | 12/1968 | Gramlich | 298/8 H |
| 3,776,587 | A |   | 12/1973 | Oxlade | |
| 4,386,801 | A | * | 6/1983 | Chapman et al. | 280/107 |

(Continued)

FOREIGN PATENT DOCUMENTS

| DE | 196 49 123 A1 | 5/1998 |
| EP | 1 190 937 A1 | 3/2002 |

(Continued)

OTHER PUBLICATIONS

Supplementary European Search Report, dated Aug. 5, 2013, (7 pgs.).

*Primary Examiner* — Dennis Pedder
(74) *Attorney, Agent, or Firm* — Foley & Lardner LLP

(57) ABSTRACT

A front underfloor structure of a vehicle (EV) includes a protruding member protruding downward from a front underfloor surface of the vehicle, and redirects a flow of traveling air that flows around a front underfloor while traveling. The protruding member is configured as a protruding member with curved surface (31) disposed at a position closer to the vehicle front than front tires (1L, 1R) and in a central portion of the front underfloor straddling a vehicle center line (CL). The protruding member with curved surface (31) has a circumference of protrusion in a vehicle longitudinal direction that is longest at the position of the vehicle center line (CL), and the circumference of protrusion in the vehicle longitudinal direction becomes gradually shorter with increasing distance from the vehicle center line (CL) on both sides in a vehicle width direction.

5 Claims, 10 Drawing Sheets

(56) References Cited

U.S. PATENT DOCUMENTS

| | | | |
|---|---|---|---|
| 5,322,340 A * | 6/1994 | Sato et al. | 296/180.1 |
| 7,661,752 B2 * | 2/2010 | Yamazaki | 296/180.1 |
| 2002/0050413 A1 | 5/2002 | Renault | |

FOREIGN PATENT DOCUMENTS

| | | |
|---|---|---|
| JP | 52-151517 A | 12/1977 |
| JP | 2003-312550 A | 11/2003 |
| JP | 2006-327281 A | 12/2006 |
| JP | 2007-90976 A | 4/2007 |
| JP | 2007-253657 A | 10/2007 |
| JP | 2008-13013 A | 1/2008 |
| JP | 2008-279819 A | 11/2008 |
| JP | 2010-58639 A | 3/2010 |
| JP | 2010-76485 A | 4/2010 |

* cited by examiner

View A

SEC : B-B

SEC : D-D

CLASSIFICATION OF
SOURCES OF AIR DRAG

FRONT UNDERFLOOR STRUCTURE OF VEHICLE

TECHNICAL FIELD

The present invention relates to a front underfloor structure of a vehicle, including a protruding member to redirect a flow of traveling air that flows around a front underfloor.

BACKGROUND ART

The following front underfloor structure of a vehicle for redirecting a flow of traveling air that flows around a front underfloor has heretofore been known. Specifically, in the structure, a chin spoiler as a protruding member is provided in a front end portion of the vehicle at a position where a front bumper fascia is set (refer to Patent Literature 1, for example).

The conventional front underfloor structure of the vehicle is provided with the chin spoiler, thereby being intended to restrict a rate of flow of traveling air that flows into the front underfloor of the vehicle and thus produce a downward force (i.e. a downforce), which suppresses lift, in a front portion of a vehicle body which is likely to lift in conjunction with increasing vehicle speed.

CITATION LIST

Patent Literature

Patent Literature 1: Japanese Patent Application Publication No. 2006-327281

SUMMARY OF INVENTION

Technical Problem

However, the conventional front underfloor structure of the vehicle is configured as a structure in which the chin spoiler for reducing a lift coefficient is disposed at the position of the front end portion of the vehicle. Therefore, the chin spoiler acts as a protrusion of drag on traveling air that flows along the front underfloor, which impedes a smooth flow of the traveling air and hence increases a drag coefficient, which in turn leads to the problem that this structure cannot be expected to achieve desired improvements in aerodynamic characteristics.

In other words, a drag coefficient CD (which is an abbreviation of Constant at the underfloor of the vehicle is an index indicating how smoothly traveling air flows along the underfloor. Meanwhile, a lift coefficient CL (which is an abbreviation of Constant Lift) at the underfloor of the vehicle is an index indicating how high the traveling air that flows along the underfloor exerts a lift force on the vehicle body to lift it. A relationship between the drag coefficient CD and the lift coefficient CL exhibits tendencies as given below: when a rate of flow of traveling air that flows into the underfloor is ensured with a smooth flow, the drag coefficient CD decreases, while the lift coefficient CL increases; on the other hand, when the rate of flow of traveling air that flows into the underfloor is restricted, the lift coefficient CL decreases, while the drag coefficient CD increases. Thus, the drag coefficient CD and the lift coefficient CL are the mutually contradictory indexes.

The present invention has been made in view of the foregoing problems. An object of the present invention is to provide a front underfloor structure of a vehicle, which is capable of reducing air drag produced by a flow of air that flows around a front underfloor while traveling, thereby achieving desired improvements in aerodynamic characteristics.

Solution to Problem

In order to attain the above object, according to the present invention, there is provided a front underfloor structure of a vehicle, including a protruding member protruding downward from a front underfloor surface of the vehicle, which redirects a flow of air that flows around a front underfloor while traveling. The protruding member is configured as a protruding member with curved surface disposed at a position closer to the vehicle front than front tires and in a central portion of the front underfloor straddling a vehicle center line. The protruding member with curved surface has a circumference of protrusion in a vehicle longitudinal direction that is longest at the position of the vehicle center line, and the circumference of protrusion in the vehicle longitudinal direction becomes gradually shorter with increasing distance from the vehicle center line on both sides in a vehicle width direction.

DESCRIPTION OF EMBODIMENTS

Figure 1:
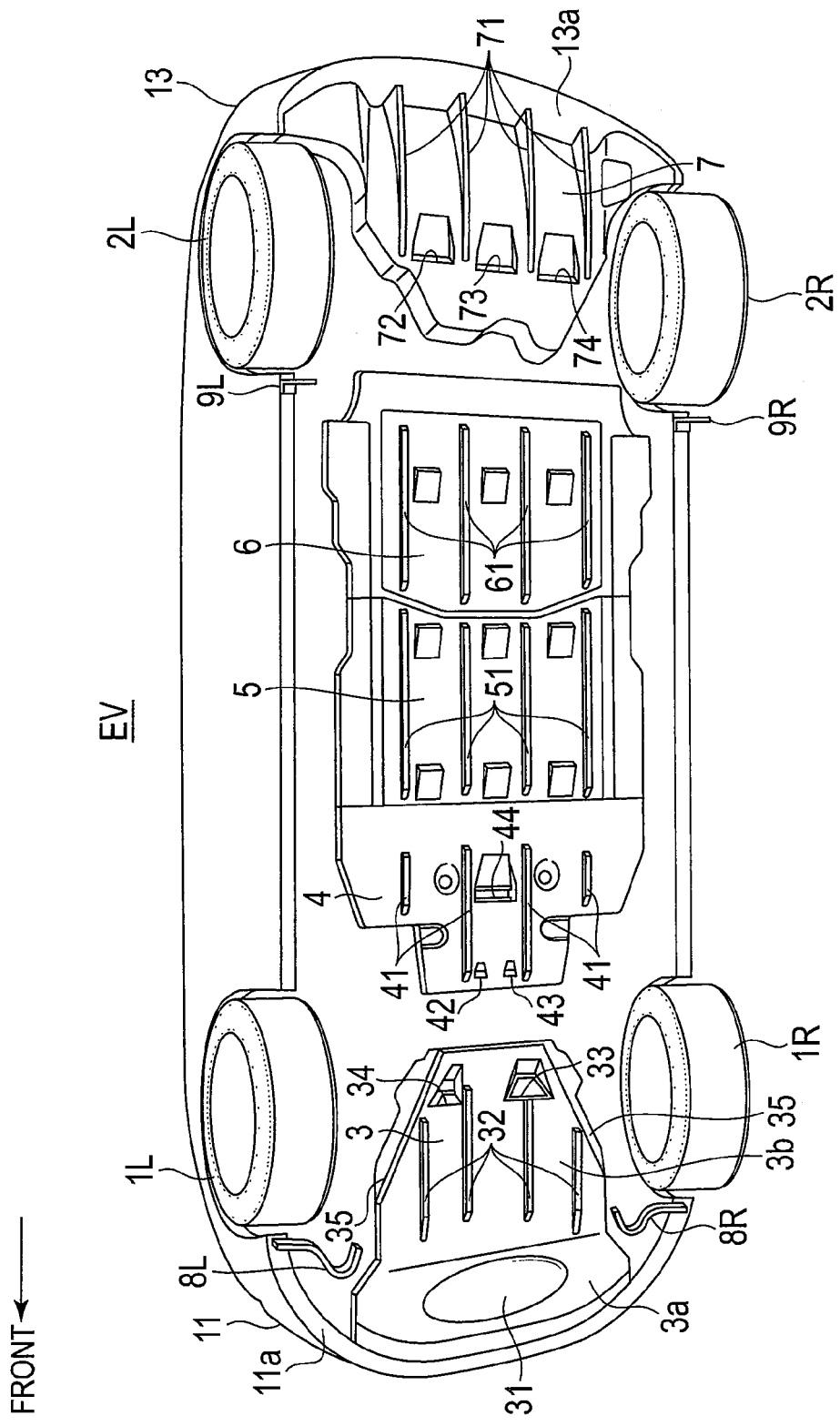
FIG. 1 is a perspective view showing an overall underfloor structure of an electric vehicle (as an example of a vehicle) to which a front underfloor structure of an embodiment 1 is applied.

Best mode for carrying out a front underfloor structure of a vehicle of the present invention will be described below with reference to an embodiment 1 shown in the drawings. Incidentally, in the following description, the front and the rear in a vehicle longitudinal direction will be referred to as "the vehicle front" and "the vehicle rear," respectively. Also, a central axis extending in the vehicle longitudinal direction, in a bottom view of the vehicle, will be referred to as a vehicle center line CL. A direction closer to the vehicle center line CL, in a vehicle width direction, will be referred to as "inward in the vehicle," and a direction farther away from the vehicle center line CL, in the vehicle width direction, will be referred to as "outward in the vehicle." The side close to the vehicle center line CL, in the vehicle width direction, will be referred to as "inward in the vehicle width direction," and the side far away from the vehicle center line CL, in the vehicle width direction, will be referred to as "the outward in the vehicle width direction."

First Embodiment

Firstly, a configuration will be described.

FIG. 1 is a perspective view showing an overall underfloor structure of an electric vehicle (as an example of the vehicle) to which the front underfloor structure of the embodiment 1 is applied. The overall underfloor structure will be described below with reference to FIG. 1.

As shown in FIG. 1, the overall underfloor structure of an electric vehicle EV of the embodiment 1 includes a pair of left and right front tires 1L, 1R, a pair of left and right rear tires 2L, 2R, a front undercover 3, a motor room rear undercover 4, a first battery undercover 5, a second battery undercover 6, a rear undercover 7, a pair of left and right front deflectors 8L, 8R, and a pair of left and right rear deflectors 9L, 9R.

Figure 2:
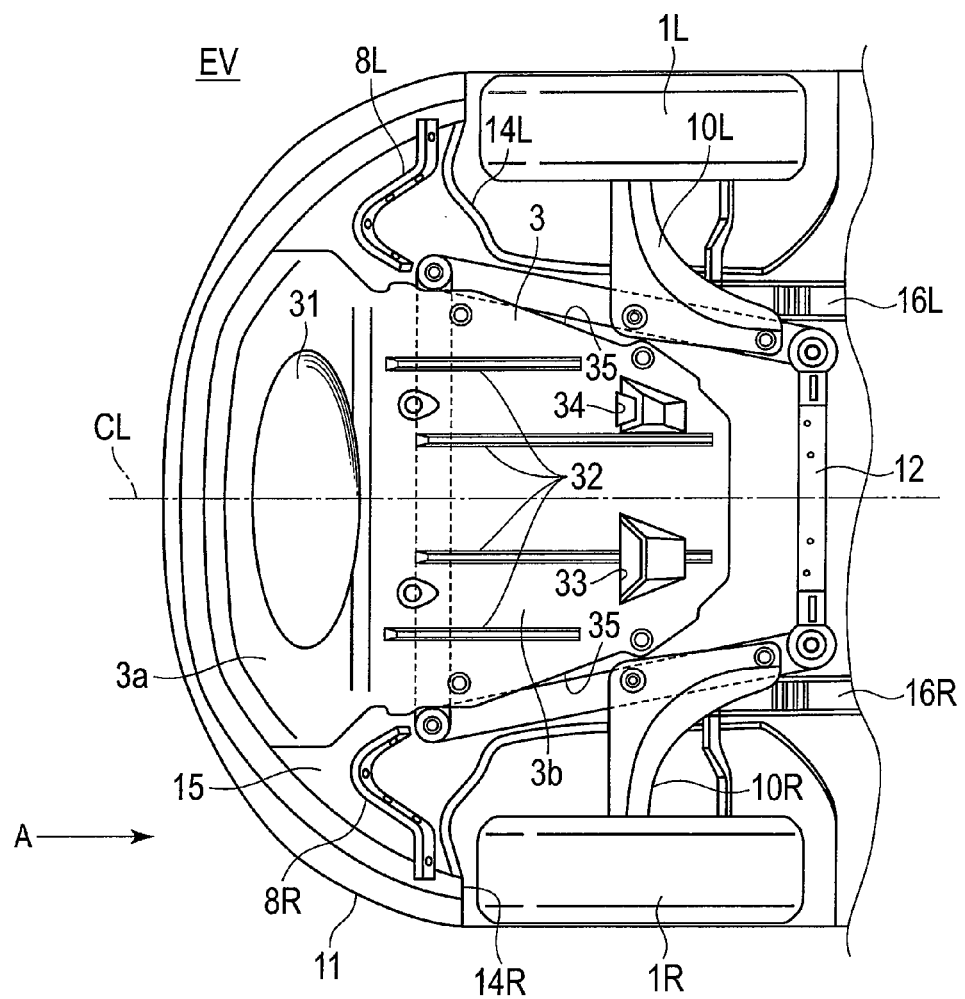
FIG. 2 is a bottom view showing the front underfloor structure of the embodiment 1.

The pair of left and right front tires 1L, 1R serve both as steering wheels and as drive wheels, and are resiliently mounted to a vehicle body through front suspension links 10L, 10R, respectively (see FIG. 2).

The pair of left and right rear tires 2L, 2R are resiliently mounted to the vehicle body through rear suspensions (unillustrated) such as trailing type suspensions.

The front undercover 3 is a member that covers a front underfloor region extending from a flange portion 11a of a front bumper fascia 11 to a front suspension member 12 (see FIG. 2). A cover surface of the front undercover 3 is formed as a smooth bent surface by an inclined portion 3a inclined downward toward the vehicle rear, and a horizontal portion 3b that is continuous with the inclined portion 3a. The inclined portion 3a is provided with a protruding portion with curved surface 31 (or a protruding member with curved surface) having a major axis in the vehicle width direction, and the horizontal portion 3b is provided with four protrusions 32 extending in the vehicle longitudinal direction, and two drain holes 33, 34. Also, the front undercover 3 has inclined side surface portions 35, 35 that are gradually reduced in width dimension (or in width dimension in the vehicle width direction) toward the vehicle rear.

The motor room rear undercover 4 is a member that covers a central front underfloor region extending from the front suspension member 12 (see FIG. 2) to a rear portion of a motor room. A cover surface of the motor room rear undercover 4 is formed as a horizontal surface at the same position as the horizontal portion 3b of the front undercover 3. The motor room rear undercover 4 is provided with four protrusions 41 extending in the vehicle longitudinal direction, two drain holes 42, 43 having a small opening area, which are formed toward the vehicle front, and a drain hole 44 having a large opening area, which is formed toward the vehicle rear.

The first battery undercover 5 and the second battery undercover 6 are members connected together to cover a central rear underfloor region extending from the rear portion of the motor room to a rear end portion of a battery unit (unillustrated). Cover surfaces of the battery undercovers 5, 6 are formed as horizontal surfaces at the same position as the cover surface of the motor room rear undercover 4. The battery undercovers 5, 6 are provided with four protrusions 51, 61 each, respectively, extending in the vehicle longitudinal direction. Incidentally, the motor room rear undercover 4 and the battery undercovers 5, 6 are connected together to form a center undercover as a whole.

The rear undercover 7 is a member that covers a rear underfloor region extending from a rear suspension member (unillustrated) to a flange portion 13a of a rear bumper fascia 13. A cover surface of the rear undercover 7 has a diffuser structure formed as an inclined surface inclined upward toward the vehicle rear, extending from the position of the same horizontal surface as the second battery undercover 6. The rear undercover 7 is provided with four protrusions 71 which extend in the vehicle longitudinal direction and increase gradually in height toward the vehicle rear, and three drain holes 72, 73, 74 disposed at positions between the protrusions 71.

The pair of left and right front deflectors 8L, 8R are disposed at forward positions forward of the pair of left and right front tires 1L, 1R, respectively, protruding downward from the forward positions, thereby to redirect a flow of traveling air that flows around the front tires 1L, 1R while traveling. Incidentally, "traveling air" refers to a relative flow of air formed around the vehicle during the vehicle's traveling.

The pair of left and right rear deflectors 9L, 9R are disposed at forward positions forward of the pair of left and right rear tires 2L, 2R, respectively, protruding downward from the forward positions, thereby to redirect a flow of traveling air that flows around the rear tires 2L, 2R while traveling.

Figure 3:
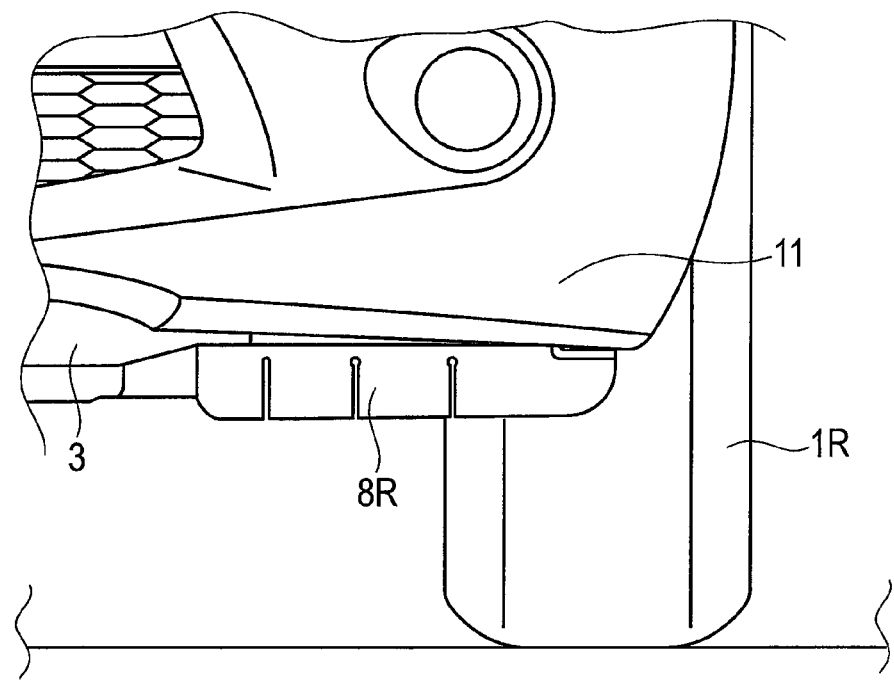
FIG. 3 is a front elevation viewed in the direction of arrow A of FIG. 2, showing a front left tire portion of the electric vehicle to which the front underfloor structure of the embodiment 1 is applied.

FIGS. 2 and 3 are views showing the front underfloor structure of the embodiment 1. The front underfloor structure will be described below with reference to FIGS. 2 and 3.

As shown in FIGS. 2 and 3, the front underfloor structure of the electric vehicle EV of the embodiment 1 includes the pair of left and right front tires 1L, 1R, the front undercover 3, the pair of left and right front deflectors 8L, 8R, the pair of left and right front suspension links 10L, 10R, the front bumper fascia 11, the front suspension member 12, a pair of left and right front wheel houses 14L, 14R, a fender protector 15, and a front side members 16L, 16R.

The pair of left and right front tires 1L, 1R, the pair of left and right front suspension links 10L, 10R, and the pair of left and right front wheel houses 14L, 14R are set at the left and right, respectively, of the front underfloor of the electric vehicle EV. The pair of left and right front tires 1L, 1R are turnably and resiliently mounted by the front suspension links 10L, 10R, respectively, supported by the front suspension member 12. Then, the pair of left and right front tires 1L, 1R are accommodated in the pair of left and right front wheel houses 14L, 14R, respectively, to thus ensure moving space that permits turning motion of the front tires 1L, 1R involved in steering, up-and-down motion involved in bounding and rebounding, and the like.

The front undercover 3 that covers a region of the front underfloor, exclusive of the pair of left and right front deflectors 8L, 8R, the pair of left and right front tires 1L, 1R, the pair of left and right front wheel houses 14L, 14R, and the pair of left and right front suspension links 10L, 10R, is attached to a central portion of the front underfloor of the electric vehicle EV in the vehicle width direction. The front undercover 3 has the protruding portion with curved surface 31, which is disposed at a position closer to the vehicle front than the pair of left and right front deflectors 8L, 8R and has a longer dimension in the vehicle width direction than a dimension in the vehicle longitudinal direction. The protruding portion with curved surface 31 has the flow redirection function of controlling a velocity of flow of traveling air that flows in from the vehicle front, thereby to suppress a divergent flow of the traveling air in the vehicle width direction and thus bring the traveling air into convergence in a region below the central portion of the front underfloor centered on the vehicle center line CL.

As shown in FIGS. 2 and 3, the front underfloor of the electric vehicle EV is provided with the pair of left and right front deflectors 8L, 8R as flow redirection plate members, which are disposed forward of the pair of left and right front tires 1L, 1R, respectively, protruding downward from a bottom surface of the front underfloor. When struck by air traveling from the vehicle front while traveling, the pair of left and right front deflectors 8L, 8R cause a flow of the traveling air to branch into two flows, redirect one of the branched flows inward in the vehicle to form a flow inward in the vehicle, and redirect the other flow outward in the vehicle to form a flow outward in the vehicle. The flow of air that flows inward in the vehicle is bypassed around the insides of the pair of left and right front tires 1L, 1R, the pair of left and right front suspension links 10L, 10R, and the pair of left and right front wheel houses 14L, 14R, which are set at the left and right, respectively, of the front underfloor. Also, the flow of air that flows outward in the vehicle is bypassed around the outsides of the pair of left and right front tires 1L, 1R and the pair of left and right front wheel houses 14L, 14R, which are set at the left and right, respectively, of the front underfloor.

FIGS. 4 to 8 are views showing a configuration of the front deflector in the front underfloor structure of the embodiment 1. The configuration of the front deflector will be described below with reference to FIGS. 4 to 8.

Figure 4:
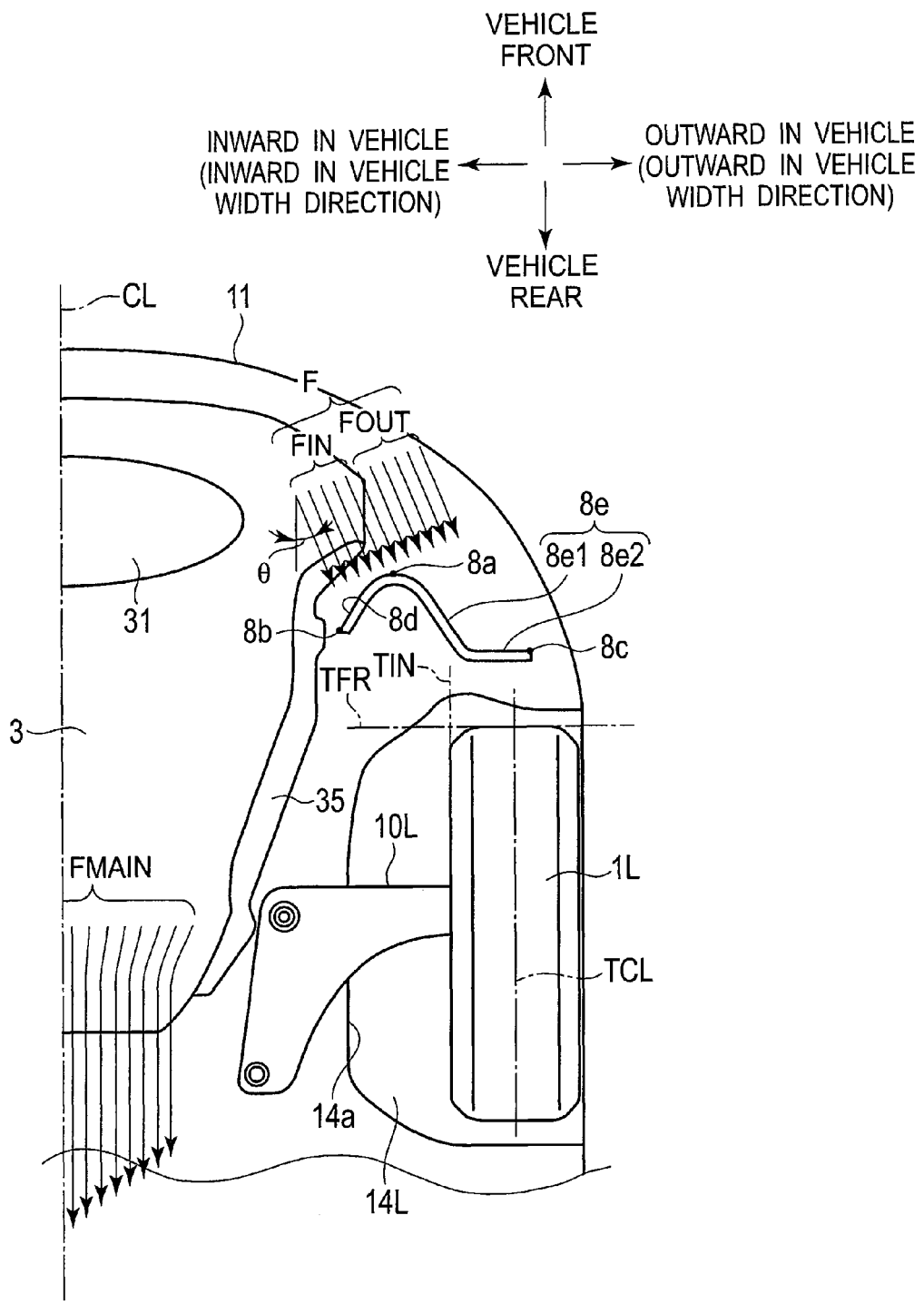
FIG. 4 is a view of assistance in explaining the relative position of a front deflector in the front underfloor structure of the embodiment 1.

As shown in FIG. 4, each of the pair of left and right front deflectors 8L, 8R includes a front apex portion 8a, an inner end portion 8b, an outer end portion 8c, a first flow redirection surface 8d, a second flow redirection surface 8e. Incidentally, the front deflectors 8L, 8R each have a shape symmetric with respect to the vehicle center line CL, and therefore, hereinbelow, description will be given with regard to the configuration of the front deflector 8L, and description of the front deflector 8R will be omitted.

As shown in FIG. 4, the front apex portion 8a is disposed on the front underfloor of the vehicle such that that the front apex portion 8a is located at a position closer to the vehicle front than the position of a leading edge surface TFR of the front tire 1L when straight (or a front edge surface of the front tire in its straight traveling position in the vehicle longitudinal direction) and also is located inward in the vehicle width direction, closer to the vehicle center line CL relative to the position of an inner surface TIN of the front tire when straight (or an inside surface of the front tire in its straight traveling position in the vehicle width direction). The position of the front apex portion 8a in the vehicle longitudinal direction and the position of the front apex portion 8a in the vehicle width direction are determined based on a direction of a streamline of traveling air such that traveling air that flows in from the vehicle front in the vehicle longitudinal direction flows toward the vehicle rear, diverging in the vehicle width direction. In other words, the position of the front apex portion 8a in the vehicle longitudinal direction and the position of the front apex portion 8a in the vehicle width direction are determined so that the front apex portion 8a branches a tire streamline flux F of traveling air having a divergent angle θ, which flows in toward the front tire 1L, into a vehicle inside streamline flux FIN and a vehicle outside streamline flux FOUT. Incidentally, the divergent angle θ refers to the angle formed by the vehicle longitudinal direction and a direction of the tire streamline flux F in the bottom view of the vehicle. The divergent angle θ has values varying according to the velocity of flow of traveling air, in such a manner that the divergent angle θ is small when the velocity of flow of traveling air is low, while the divergent angle θ becomes larger as the velocity of flow of traveling air becomes higher. Therefore, positioning of the front apex portion 8a is accomplished by performing experiments or the like to determine a traveling air flow velocity region having the great effect of reducing running resistance, and positioning the front apex portion 8a based on the divergent angle θ in the determined traveling air flow velocity region.

As shown in FIG. 4, the inner end portion 8b is disposed at a position closer to the vehicle rear than the front apex portion 8a and inward of the front apex portion 8a in the vehicle width direction. The position of the inner end portion 8b in the vehicle width direction is substantially coincident with the position of an inside surface 14a of the front wheel house 14L in the vehicle width direction.

As shown in FIG. 4, the outer end portion 8c is disposed at a position closer to the vehicle rear than the front apex portion 8a and outward of in the vehicle width direction relative to the front apex portion 8a. The position of the outer end portion 8c in the vehicle longitudinal direction is such that the outer end portion 8c is located slightly toward the vehicle rear relative to the inner end portion 8b. The position of the outer end portion 8c in the vehicle width direction is such that the outer end portion 8c is located outward of a tire central axis TCL of the front tire 1L when straight (or a width center line of the front tire in its straight traveling position).

As shown in FIG. 4, the first flow redirection surface 8d connects the front apex portion 8a and the inner end portion 8b, and is configured such that, when struck by air traveling from the vehicle front, the first flow redirection surface 8d redirects a flow of the traveling air inward in the vehicle to form a flow inward in the vehicle. The first flow redirection surface 8d is configured as a deflection surface having an angle of inclination such that the deflection surface is inclined inward in the vehicle (or the deflection surface is inclined inward in the vehicle toward the vehicle rear), thereby to redirect the vehicle inside streamline flux FIN of traveling air branched by the front apex portion 8a, to a main streamline flux FMAIN of traveling air passing below the central portion of the front underfloor centered on the vehicle center line CL. The deflection surface of the first flow redirection surface 8d is configured as the surface inclined at an angle along the inclined side surface portions 35, 35 of the front undercover 3. A portion of the first flow redirection surface 8d in the vicinity of the inner end portion 8b is substantially parallel to the inclined side surface portions 35, 35 of the front undercover 3.

As shown in FIG. 4, the second flow redirection surface 8e connects the front apex portion 8a and the outer end portion 8c, and is configured such that, when struck by air traveling from the vehicle front, the second flow redirection surface 8e redirects a flow of the traveling air outward in the vehicle to form a flow outward in the vehicle. The second flow redirection surface 8e has a curved flow redirection surface 8e1 configured as a deflection surface having an angle of inclination such that the deflection surface is inclined obliquely rearward and outward in the vehicle (or the deflection surface is inclined outward in the vehicle toward the vehicle rear), and a flat flow redirection surface 8e2 configured as a deflection surface having an angle of inclination such that the deflection surface is inclined laterally outward in the vehicle (or the deflection surface is inclined outward in the vehicle at a larger angle of inclination than that of the curved flow redirection surface 8e1). The curved flow redirection surface 8e1 gradually redirects, obliquely outward, the vehicle outside streamline flux FOUT of traveling air branched by the front apex portion 8a to form a obliquely outward flow. The flat flow redirection surface 8e2 redirects the obliquely outward flow of air from the curved flow redirection surface 8e1, further outward in the vehicle width direction to form a flow outward in the vehicle width direction.

Figure 5:
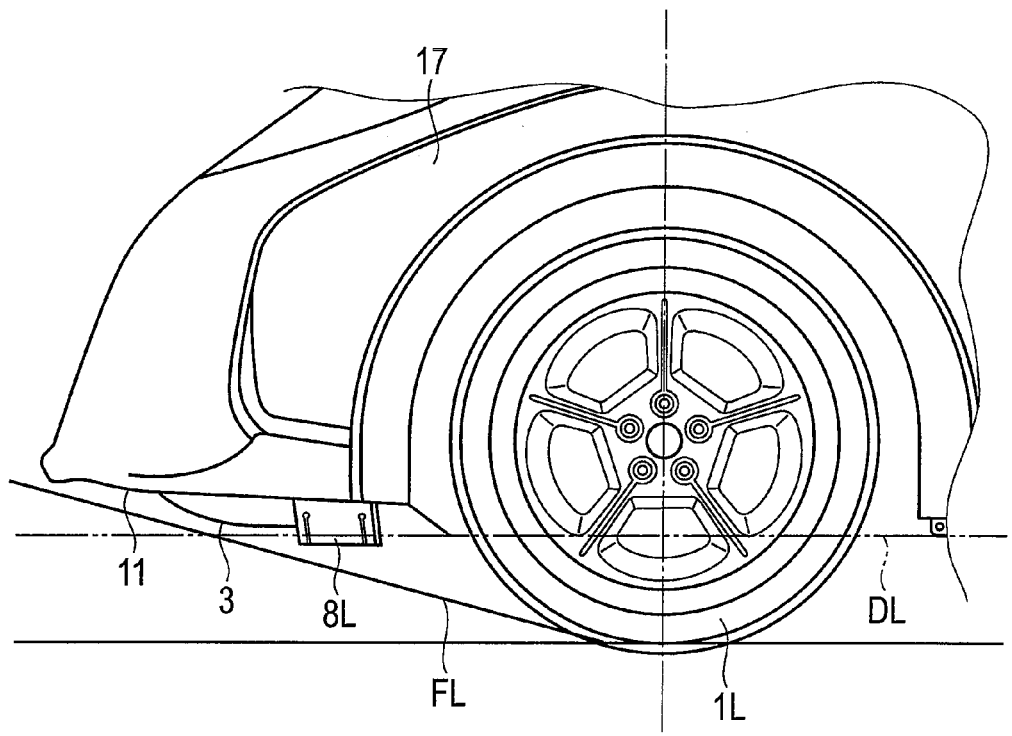
FIG. 5 is a side view showing the front left tire portion of the electric vehicle to which the front underfloor structure of the embodiment 1 is applied.

As shown in FIG. 5, a height of a protrusion of the front deflector 8L from the bottom surface of the front underfloor is set lower than a front inclined line FL and higher than a door portion horizontal line DL. As employed herein, the front inclined line FL refers to the line that connects the position of contact of the front tire 1L and the position of a lower end of the front bumper fascia 11. The door portion horizontal line DL refers to the line that connects lower ends of a front fender 17 in a horizontal direction. In other words, the height of the protrusion of the front deflector 8L from the bottom surface of the front underfloor is set so that a height that permits preventing interference with a road surface is set as an upper limit height (i.e. the front inclined line FL), and a height that permits fully achieving the flow redirection function while traveling is set as a lower limit height (i.e. the door portion horizontal line DL).

Figure 6:
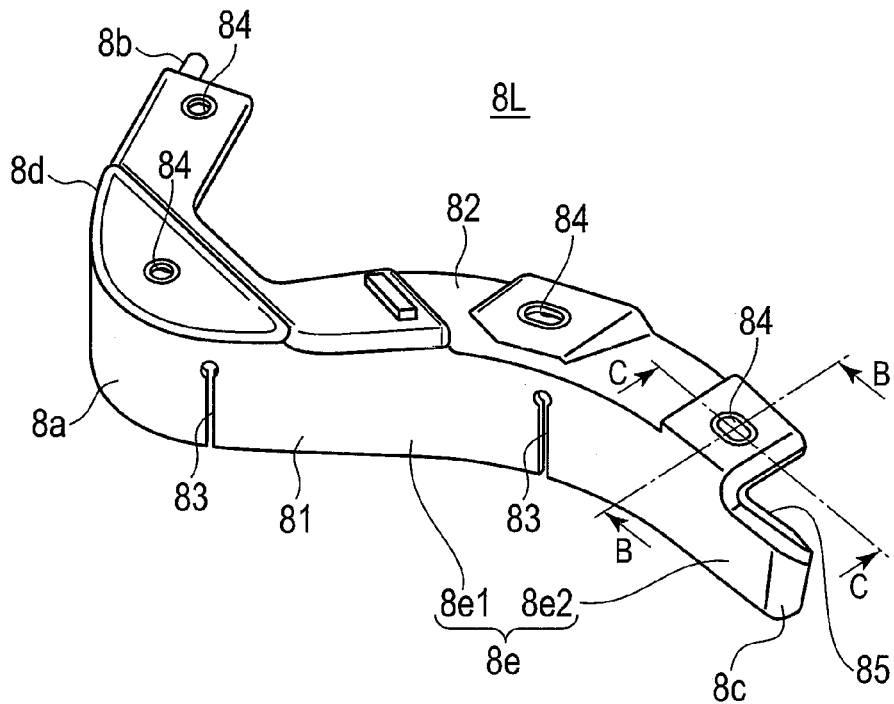
FIG. 6 is a perspective view showing the front deflector in the front underfloor structure of the embodiment 1.

As shown in FIG. 6, a specific configuration of the front deflector 8L includes integrally a deflector body portion 81 having the first flow redirection surface 8d and the second flow redirection surface 8e, and a mounting flange portion 82 for mounting the deflector body portion 81 to the fender protector 15. The front deflector 8L is manufactured by using a flexible material such as polypropylene containing rubber. Also, the deflector body portion 81 is provided with plural slits 83 (e.g. three in the embodiment 1) in a direction of from top to bottom of the vehicle. The flexible material and the slits 83 prevent impairment of the flow redirection function even if the front deflector 8L is subjected to a deformation force, in such a manner that the front deflector 8L is easily deformed by stone or the like and, after deformation, is immediately restored to its original shape by a restoring force. The mounting flange portion 82 is provided with plural J-bolt holes 84 (e.g. four in the embodiment 1). Then, the second flow redirection surface 8e is provided at its end portion side with an overhang notch groove 85 in order that the second flow redirection surface 8e is mounted extending over the flange portion 11a of the front bumper fascia 11.

Figure 7:
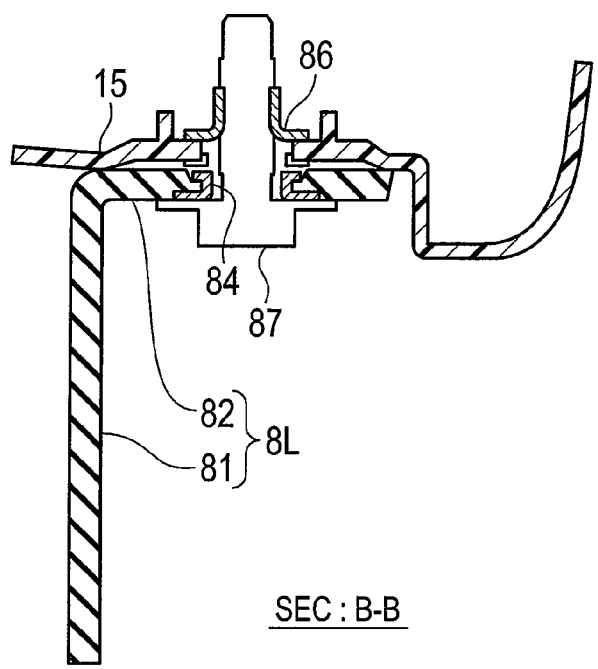
FIG. 7 is an end view in section taken along line B-B of FIG. 6, showing a mounting structure for the front deflector in the front underfloor structure of the embodiment 1.
Figure 8:
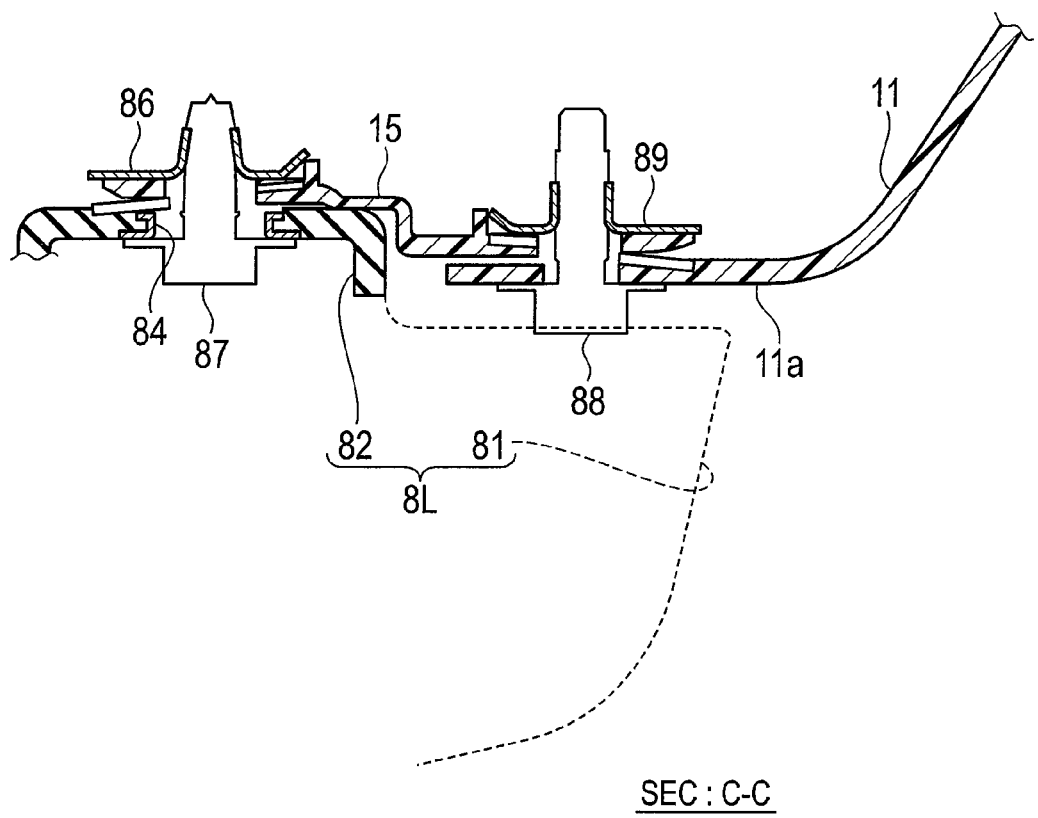
FIG. 8 is an end view in section taken along line C-C of FIG. 6, showing the mounting structure for the front deflector in the front underfloor structure of the embodiment 1.

As shown in FIG. 7, the mounting of the front deflector 8L is accomplished by providing the fender protector 15 with a J-nut 86 beforehand, and screwing J-bolts 87 from the outside into the J-bolt holes 84. As shown in FIG. 8, the mounting of the second flow redirection surface 8e at its end portion side is accomplished by fixing the fender protector 15 to the flange portion 11a of the front bumper fascia 11 by a J-bolt 88 and a J-nut 89, and screwing the J-bolts 87 from the outside into the J-bolt holes 84 with the second flow redirection surface 8e extending over the flange portion 11a through the overhang notch groove 85.

Figure 9:
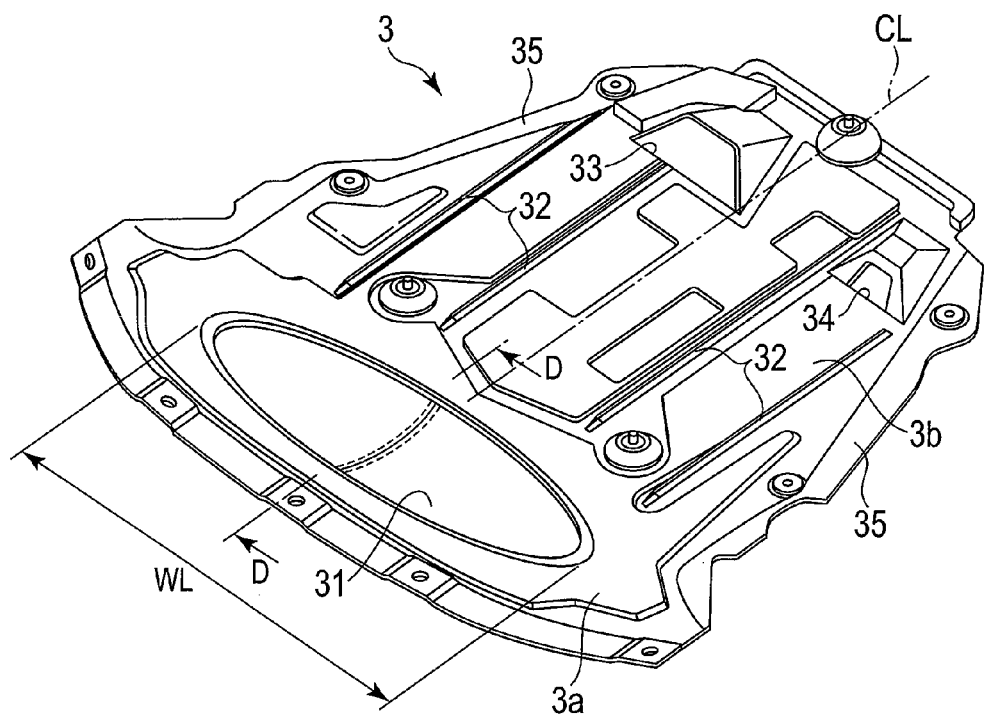
FIG. 9 is a perspective view showing a front undercover in the front underfloor structure of the embodiment 1.
Figure 10:
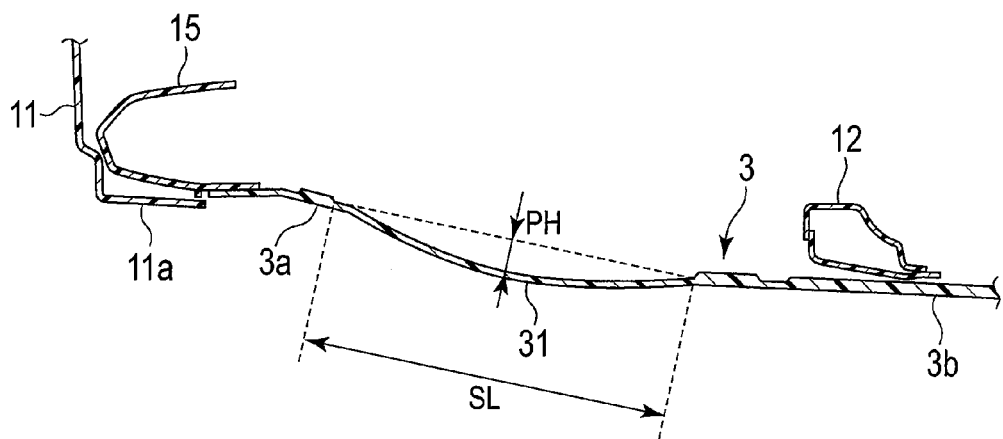
FIG. 10 is an end view in section taken along line D-D of FIG. 9, showing a protruding portion with curved surface of the front undercover in the front underfloor structure of the embodiment 1.

FIGS. 9 and 10 are views showing the front undercover in the front underfloor structure of the embodiment 1. A configuration of the front undercover will be described below with reference to FIGS. 9 and 10.

As shown in FIG. 9, the front undercover 3 is a resin coated plate having a trapezoidal shape in such a way as to cover the entire region of the front underfloor, exclusive of the regions of the pair of left and right front tires 1L, 1R. As shown in FIG. 10, the front undercover 3 is fixed to the fender protector 15 by J-bolts (unillustrated). The inclined portion 3a of the front undercover 3 has the protruding portion with curved surface 31 molded integrally with the front undercover 3, which is located at a position closer to the vehicle front than the pair of left and right front deflectors 8L, 8R. A configuration of the protruding portion with curved surface 31 will be described in detail below.

The protruding portion with curved surface 31 is the protruding member with curved surface disposed at a position closer to the vehicle front than the pair of left and right front tires 1L, 1R and in the central portion of the front underfloor straddling the vehicle center line CL. The protruding portion with curved surface 31 has a circumference of protrusion in the vehicle longitudinal direction (or a circumference of a surface of the protruding portion with curved surface 31 at its position in the vehicle width direction, across its end toward the vehicle front and its end toward the vehicle rear) that is longest at the position of the vehicle center line CL, and the circumference of protrusion in the vehicle longitudinal direction becomes gradually shorter with increasing distance from the vehicle center line CL on both sides in the vehicle width direction.

As shown in FIG. 9, the protruding member with curved surface 31 has an external configuration having an oval shape having a dimension WL in the vehicle width direction as a major axis and a dimension SL in the longitudinal direction as a minor axis. The shape of a protruding curved surface of the protruding member with curved surface 31 is configured as follows. As shown in FIG. 10, the longest arc linear element is set at a protrusion height PH at the position of the vehicle center line CL. Then, as shown in FIG. 9, the shape of the protruding curved surface is configured as a spherical three-dimensional shape formed by gathering similar arc linear elements that become gradually shorter in length in a direction from the vehicle center line CL toward both sides in the vehicle width direction.

In other words, the protruding member with curved surface 31 has the shape of the protruding curved surface like a portion of a rugby ball as cut off, in terms of external appearance. Also, the protruding member with curved surface 31 is configured in functional terms so that the velocity of flow of traveling air is highest at the position of the vehicle center line CL, and the velocity of flow of traveling air becomes gradually lower with increasing distance from the vehicle center line CL on both sides in the vehicle width direction.

Next, operation will be described.

Firstly, description will be given "regarding air drag on the vehicle." Then, operation of the front underfloor structure of the electric vehicle EV of the embodiment 1 will be described in sections "operation for improving aerodynamic characteristics by the underfloor and the entire tires," "operation for reducing air drag on the front underfloor and the front tires by the protruding portion with curved surface," "operation for reducing air drag on the front underfloor and the front tires by the front deflectors," and "operation for reducing air drag by a combination."

[Regarding Air Drag on the Vehicle]

Air drag D (N) on the vehicle is defined as Equation (1):

$$D = CD \times \frac{1}{2} \times \rho \times u^2 \times A \qquad (1)$$

where CD denotes a drag coefficient (which is a dimensionless number); $\rho$, air density (kg/m$^3$); u, relative velocity of air and the vehicle (m/sec); and A, a frontal projected area (m$^2$).

As is apparent from Equation (1), the air drag D has a value that is proportional to the drag coefficient CD and is proportional to a square of the relative velocity u of the air and the vehicle (which is equal to the velocity of flow of traveling air, or is equal to a travel speed of the vehicle, for example when no flow of air takes place).

To reduce the air drag D, a series of processes is to see the followings:

(a) by what amount of deviation the drag coefficient CD deviates from a target;

(b) where a cause of deviation from the target lies in; and (c) to what extent the target is approached by eliminating the cause.

Of these, (a) and (c) can be obtained from the drag coefficient CD calculated accurately by computational fluid dynamics; however, accurate determination of (b) is difficult with only velocity or pressure calculated by computational fluid dynamics.

Figure 11:
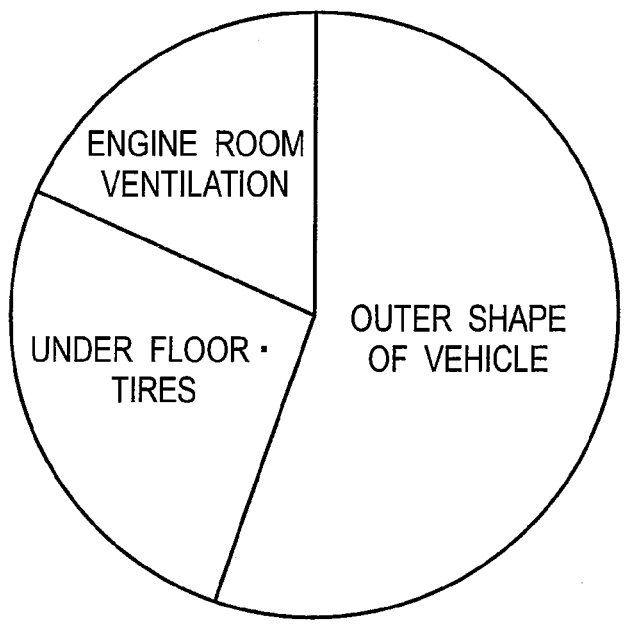
FIG. 11 is a circle graph showing classification of sources of air drag on typical passenger cars (e.g. engine driven cars).

As for the air drag D, FIG. 11 shows classification of sources of air drag on typical passenger cars (e.g. engine driven cars). As is apparent from FIG. 11, an outer shape of the vehicle forms the largest proportion of the sources of drag. However, the underfloor and the tires form the second largest proportion of the sources of drag, which exceeds the proportion of air drag caused by engine room ventilation. In other words, it cannot be said with assurance that the air drag D depends only on styling of the vehicle's outer shape, and it can be seen that consideration is necessary for the sources of drag including the underfloor and tires and the engine room ventilation.

Meanwhile, improvements in aerodynamic characteristics for a reduction in the air drag D have been made focusing mainly on the styling of the vehicle's outer shape. However, in the case of, for example, a vehicle that needs to ensure ride comfort in its rear seats, improvements in aerodynamic characteristics, even if made by the styling of the vehicle's outer shape, have their own limitations because of restrictions on design, that is, a need to ensure cabin space in the rear seats. In other words, when desired aerodynamic characteristics are set to high level for purposes of extension of cruising range, improvements made only by the styling of the vehicle's outer shape cannot be expected to achieve improvements such that the desired aerodynamic characteristics are reached.

It may also be said that how long the cruising range is extended by a given capacity of a fully charged battery is a lifeline, particularly for an electric vehicle having the battery mounted in limited space on the underfloor. In the electric vehicle, when improvements in aerodynamic characteristics made by the styling of the vehicle's outer shape are at their limits, minimization of air drag caused by the underfloor and the entire tires leads to a reduction in air drag on the electric vehicle as a whole and the extension of the cruising range, which is a vital technical issue. Then, in order to achieve an effective reduction in the air drag on the underfloor and the entire tires, suppression of a turbulent flow produced by the front underfloor and the front tires that are present in a region where a flow of traveling air starts flowing in is important in achieving the reduction in the air drag caused by the underfloor and the entire tires.

[Operation for Improving Aerodynamic Characteristics by the Underfloor and the Entire Tires]

As described above, in the electric vehicle, the minimization of the air drag caused by the underfloor and the entire tires is important in extending the cruising range. Description will be given below with regard to the operation for improving aerodynamic characteristics by the underfloor and the entire tires in the electric vehicle EV of the embodiment 1, reflecting the above.

In the electric vehicle EV, as shown in FIG. 1, the undercovers 3, 4, 5, 6, 7 cover substantially the entire region of the underfloor, exclusive of the tires and so on. This ensures an even, continuous, smooth surface extending from a front end of the vehicle to a rear end of the vehicle, and a flow of traveling air that flows in from the vehicle front forms the main streamline flux FMAIN passing below an underfloor central region centered on the vehicle center line CL. Thus, the flow of the traveling air that flows in from the vehicle front flows past the undercovers 3, 4, 5, 6, 7 and smoothly escapes to the vehicle rear. The rear undercover 7 that covers the rear underfloor, in particular, has the diffuser structure and thus adds an operation for promoting the escape of the flow of the traveling air to the vehicle rear. In this manner, the flow of the traveling air smoothly flows in an orderly line below the underfloor central region extending from the front end of the vehicle to the rear end of the vehicle, so that the air drag D is reduced in the underfloor central region.

In the electric vehicle EV, as shown in FIG. 1, the pair of left and right front deflectors 8L, 8R are disposed forward of the pair of left and right front tires 1L, 1R, respectively. Thereby, a flow of traveling air that flows around the front tires 1L, 1R while traveling is redirected so as to suppress the flow of the traveling air into the regions of the front tires 1L, 1R. As a result, the air drag D is reduced in the regions of the front tires 1L, 1R by suppression of the flow of the traveling air into the regions of the front tires 1L, 1R where an increase in the air drag is mainly caused.

In the electric vehicle EV, as shown in FIG. 1, the pair of left and right rear deflectors 9L, 9R are disposed forward of the pair of left and right rear tires 2L, 2R, respectively. Thereby, a flow of traveling air while traveling is redirected so as to be bypassed around the rear tires 2L, 2R. As a result, the air drag D is reduced in the regions of the rear tires 2L, 2R by the flow of the traveling air being bypassed around the rear tires 2L, 2R.

In the electric vehicle EV, as shown in FIG. 1, the front undercover 3 is provided with the protruding portion with curved surface 31 for controlling the velocity of flow of traveling air. This suppresses a divergent flow of traveling air that flows in from the vehicle front while traveling, thereby to form the main streamline flux FMAIN passing below the central portion of the front underfloor centered on the vehicle center line CL. As a result, the traveling air that flows in from the front end of the vehicle is brought into convergence in the central region of the front underfloor, so that the air drag D is reduced in the central region of the front underfloor.

As described above, the electric vehicle EV of the embodiment 1 adopts the underfloor structure intended to improve aerodynamic characteristics of the underfloor and the entire tires. This reduces the air drag D on the underfloor and the entire tires of the electric vehicle EV, and thus enables achieving improvements in aerodynamic characteristics as a whole such that the cruising range of the electric vehicle EV is extended.

[Operation for Reducing Air Drag on the Front Underfloor and the Front Tires by the Protruding Portion with Curved Surface]

As described above, in the electric vehicle, in order to achieve the effective reduction in the air drag on the underfloor and the entire tires, it is important that the turbulent flow produced by the front underfloor and the front tires that are present in the region where a flow of traveling air starts flowing in be suppressed to achieve the reduction in the air drag. Description will be given below with regard to the operation for reducing air drag on the front underfloor and the front tires by the protruding portion with curved surface 31 of the front undercover 3 in the electric vehicle EV of the embodiment 1, reflecting the above.

Figure 12:
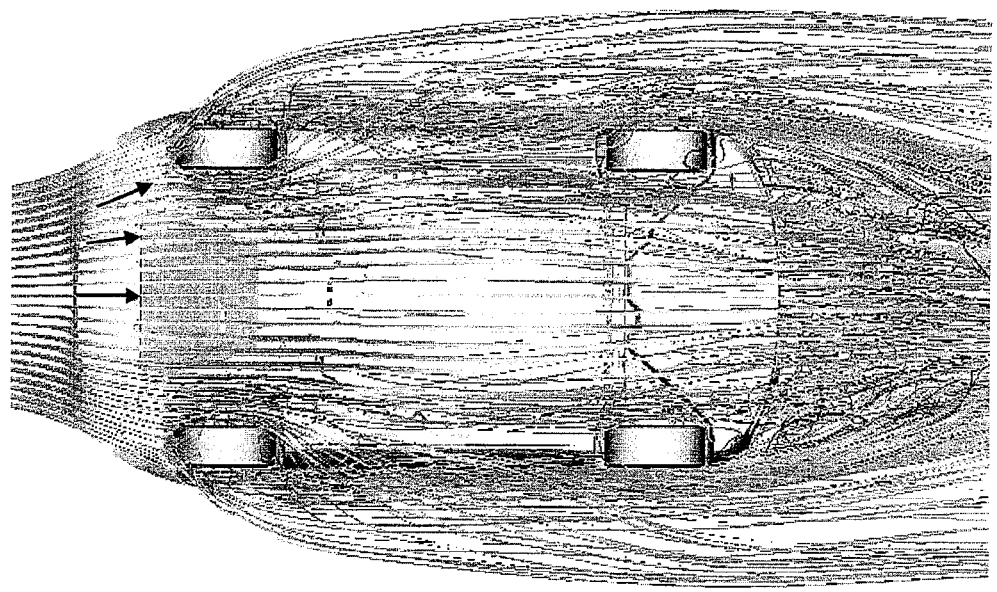
FIG. 12 is a representation of flow of traveling air, showing a flow of traveling air that flows around a front underfloor and front tires in an electric vehicle of a comparative example.

Firstly, FIG. 12 shows results of analytical tests which the inventors have performed on a flow of traveling air that flows around the front underfloor and the front tires of the electric vehicle. Analyses of the cause and mechanism of air drag in the front underfloor region of the vehicle, based on the test results, have showed that, when the protruding portion with curved surface 31 of the front undercover 3 is used for flow redirection, consideration is necessary for two points given below.

(A) When a flow of traveling air strikes the front tires 1L, 1R or the front suspension links 10L, 10R, collision of the flow of traveling air produces high air drag, and further, when the tires rotate with steering, the flow of traveling air is stirred and thus produces higher air drag. Also, when the flow of traveling air is drawn into the front wheel houses 14L, 14R, the front wheel houses 14L, 14R are filled with the air to thus produce a vortex structure (e.g. a vortex tube or a vortex layer), and the vortex structure grows into high air drag. In other words, it has been shown that the regions of the front tires 1L, 1R (i.e. the front tires 1L, 1R and their peripheral regions (i.e. the front suspension links 10L, 10R, the front wheel houses 14L, 14R, etc.)) which the flow of traveling air strikes or into which the flow of traveling air is drawn are locations where the increase in the air drag is mainly caused.

(B) Focusing on a streamline of air introduced from the vehicle front, traveling toward the pair of left and right front tires 1L, 1R, it can be seen that a phenomenon similar to a back rush takes place; for example, when a ship is moving, the bottom of the ship pushes aside water, and thus, the back rush occurs. In other words, it has been shown that, while the vehicle is traveling, the front underfloor pushes aside surrounding air, and thus, a streamline having a divergent angle diverging in the vehicle width direction toward the vehicle rear is drawn as shown by arrows of FIG. 12.

Meanwhile, in the embodiment 1, the protruding portion with curved surface 31 is disposed at the position closer to the vehicle front than the front tires 1L, 1R and in the central portion of the front underfloor straddling the vehicle center line CL, taking it into account that traveling air flowing in from the vehicle front flows toward the vehicle rear, diverging in the vehicle width direction. The protruding portion with curved surface 31 has the circumference of protrusion in the vehicle longitudinal direction that is longest at the position of the vehicle center line CL, and the circumference of protrusion in the vehicle longitudinal direction becomes gradually shorter with increasing distance from the vehicle center line CL on both sides in the vehicle width direction.

Thus, in the protruding portion with curved surface 31, the velocity of flow of traveling air is highest at the position of the vehicle center line CL, and the pressure of the traveling air is lowest at the position of the vehicle center line CL. Then, in the protruding portion with curved surface 31, the velocity of flow of traveling air becomes gradually lower and the pressure of the traveling air becomes gradually higher with increasing distance from the vehicle center line CL on both sides in the vehicle width direction. By this operation for controlling the flow velocity and the pressure, a pressure distribution across end portions of the protruding portion with curved surface 31 in the vehicle width direction is such that the pressure is lowest at the position of the vehicle center line CL, and the pressure becomes higher with increasing distance from the vehicle center line CL on both sides in the vehicle width direction. Therefore, a flow of traveling air is deflected from the end portions in the vehicle width direction at which the pressure is high, toward the vehicle center line CL at which the pressure is lowest, so as to reduce a differential pressure in the pressure distribution. In other words, the protruding portion with curved surface 31 deflects and redirects a flow of traveling air that is diverging in the vehicle width direction while flowing toward the vehicle rear, back to the region below the central portion of the front underfloor, thereby to suppress a divergent flow of the traveling air in the vehicle width direction.

Figure 13:
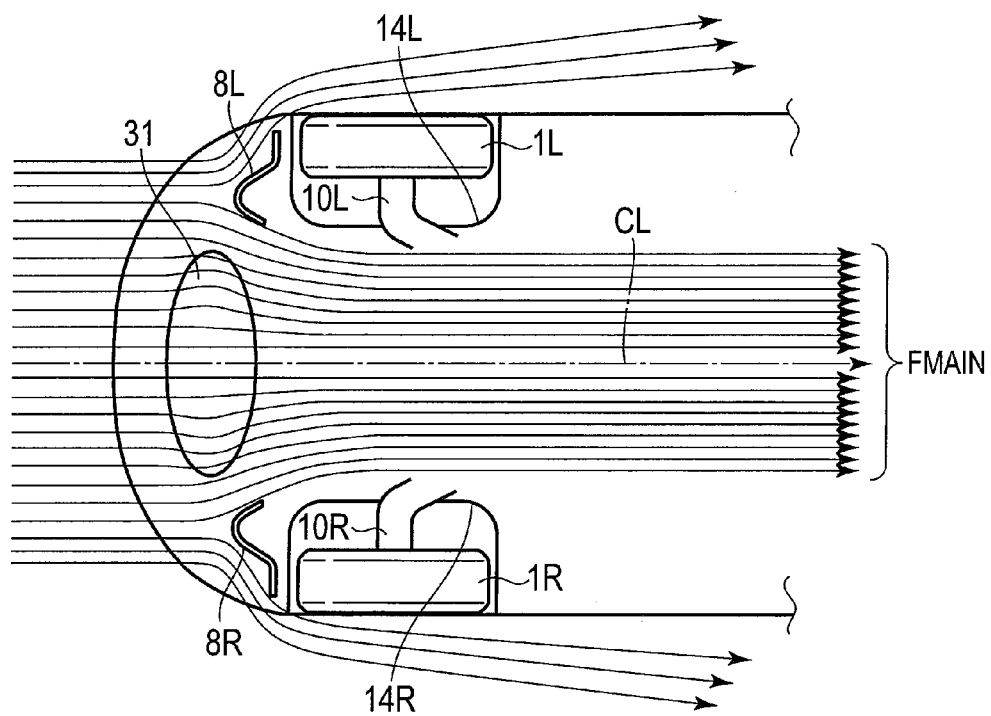
FIG. 13 is a view of streamline of traveling air, showing a flow of traveling air that flows around the front underfloor and the front tires in the electric vehicle to which the front underfloor structure of the embodiment 1 is applied.

In this manner, the protruding portion with curved surface 31 serves the flow redirection function for suppressing a divergent flow of traveling air in the vehicle width direction, at the position of the front underfloor, thereby to reduce a rate of flow of traveling air into the front tire regions where air drag is mainly caused on the front underfloor. In other words, as shown in FIG. 13, streamlines converge below the central portion of the underfloor to form the main streamline flux FMAIN as a streamline of a flow downstream of the protruding portion with curved surface 31, thereby suppressing the occurrence of a turbulent flow in the regions of the front tires 1L, 1R disposed on both sides of the main streamline flux FMAIN.

It has been observed that, for example when a turbulent flow occurs in the front tire region, a vortex structure (a vortex tube and a vortex layer) is present on a very small scale in the turbulent flow, and the frequency of occurrence of the process of formation of the vortex tube from the vortex layer (or the process of transition from the vortex layer to the vortex tube) is increased. Then, it is known that a small-scale vortex structure is formed and the turbulent flow grows to thus increase the air drag D. Therefore, the suppression of occurrence of a turbulent flow in the front tire regions leads directly to a reduction in the air drag D.

As described above, in the embodiment 1, the protruding portion with curved surface 31 for suppressing a divergent flow of traveling air in the vehicle width direction is disposed at the position closer to the vehicle front than the front tires 1L, 1R and in the central portion of the front underfloor straddling the vehicle center line CL. Thus, a turbulent flow produced by the front underfloor and the front tires that are present in the region where a flow of traveling air starts flowing in, while traveling, is suppressed, so that a reduction in the air drag D can be achieved.

[Operation for Reducing Air Drag on the Front Underfloor and the Front Tires by the Front Deflectors]

As described above, in the electric vehicle EV, in order to achieve the effective reduction in the air drag on the underfloor and the entire tires, it is important that the turbulent flow produced by the front underfloor and the front tires that are present in the region where a flow of traveling air starts flowing in be suppressed to achieve the reduction in the air drag. Description will be given below with regard to the operation for reducing air drag on the front underfloor and the front tires by the front deflectors 8L, 8R in the electric vehicle EV of the embodiment 1, reflecting the above.

First, analyses of the cause and mechanism of air drag in the front underfloor region of the vehicle, based on the test results shown in FIG. 12, have showed that, when the front deflectors 8L, 8R are used for flow redirection, consideration is necessary for the above (A) and (B).

Figure 14:
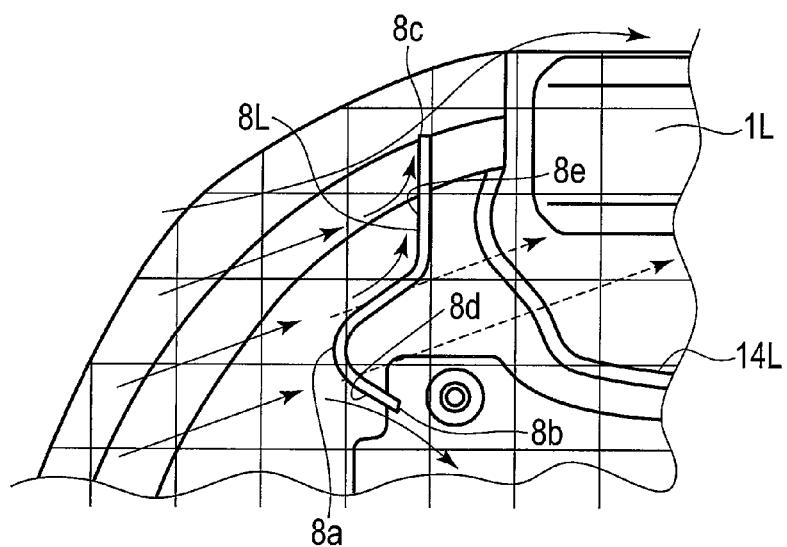
FIG. 14 is a view of streamline of traveling air, showing a flow of traveling air that flows around the front left tire in the electric vehicle to which the front underfloor structure of the embodiment 1 is applied.

Meanwhile, in the embodiment 1, the front apex portions 8a of the pair of left and right front deflectors 8L, 8R are disposed at the position closer to the vehicle center line CL which is inward in the vehicle width direction of the positions of the inner surfaces TIN of the front tires 1L, 1R when straight, taking into account a streamline of traveling air diverging in the vehicle width direction. Thus, as shown in FIGS. 13 and 14, when a flow of traveling air that flows toward the vehicle rear, diverging in the vehicle width direction, reaches the front apex portions 8a of the pair of left and right front deflectors 8L, 8R, the flow of traveling air branches off from the front apex portions 8a into flows in two directions, which are directed inward in the vehicle and outward in the vehicle, respectively. The flow of traveling air branched inward in the vehicle is redirected by the first flow redirection surfaces 8d and is bypassed around the inner periphery sides of the pair of left and right front tires 1L, 1R. Meanwhile, the flow of traveling air branched outward in the vehicle is redirected by the second flow redirection surfaces 8e and is bypassed around the outer periphery sides of the pair of left and right front tires 1L, 1R.

In other words, the first flow redirection surface 8d serves the flow redirection function for deflecting a divergent flow of traveling air in the vehicle width direction to an inward convergent flow of traveling air, and thereby directing the flow of traveling air back to the front underfloor. Meanwhile, the second flow redirection surface 8e serves the flow redirection function for deflecting a divergent flow of traveling air in the vehicle width direction to a more divergent flow of traveling air in the vehicle width direction, and thereby releasing the flow of traveling air to the outside of the vehicle.

The pair of left and right front deflectors 8L, 8R serve the flow redirection function for bypassing flows of traveling air around the inner and outer peripheries of the pair of left and right front tires 1L, 1R, thereby to reduce the rate of flow of traveling air into the front tire regions where air drag is mainly caused. In other words, as shown in FIG. 13, a streamline that avoids the flow of traveling air into the regions of the front tires 1L, 1R is formed as a streamline of a flow downstream of the front deflectors 8L, 8R, thereby to suppress the occurrence of a turbulent flow in the regions of the front tires 1L, 1R.

As described above, in the embodiment 1, the front apex portions 8a of the front deflectors 8L, 8R are located so as to branch a flow of traveling air that flows in from the vehicle front and diverges in the vehicle width direction, into flows in two directions, which are directed inward in the vehicle and outward in the vehicle, respectively. Thus, a turbulent flow produced by the front underfloor and the front tires that are present in the region where a flow of traveling air starts flowing in, while traveling, is suppressed, so that a reduction in the air drag D can be achieved.

[Operation for Reducing Air Drag by a Combination]

For a reduction in the air drag D caused by the front underfloor and the front tires, it is important that the flow of traveling air branched inward in the vehicle by the front deflectors be kept in an inward direction until the flow of traveling air passes through the front tire regions. Description will be given below with regard to the operation for reducing air drag by a combination of the protruding portion with curved surface 31 and the front deflectors 8L, 8R in the embodiment 1, reflecting the above.

The front apex portions 8a of the pair of left and right front deflectors 8L, 8R branch a flow of traveling air that flows in from the vehicle front, in the inward direction. Then, the first flow redirection surfaces 8d redirect the vehicle inside streamline flux FIN of traveling air branched, to the main streamline flux FMAIN of traveling air passing below the central portion of the front underfloor centered on the vehicle center line CL. At this time, for example, when the flow of traveling air directed toward the main streamline flux FMAIN of traveling air is subjected to drag by being pressed from the main streamline flux FMAIN side, the flow of traveling air flows back to the insides of the front tires 1L, 1R and into the front wheel houses 14L, 14R.

Meanwhile, the front undercover 3 that covers the front underfloor is provided with the protruding portion with curved surface 31 for suppressing a divergent flow of traveling air in the vehicle width direction, which is disposed at the position closer to the vehicle front than the pair of left and right front deflectors 8L, 8R. Thus, the protruding portion with curved surface 31 serves the flow redirection function for bringing traveling air that flows in from the vehicle front into convergence to form traveling air passing below the central portion of the front underfloor centered on the vehicle center line CL, and thereby forming the main streamline flux FMAIN of traveling air (see FIG. 13).

By the flow redirection function of the first flow redirection surfaces 8d, therefore, the flow of traveling air directed toward the main streamline flux FMAIN of traveling air passing below the central portion of the front underfloor centered on the vehicle center line CL joins smoothly the main streamline flux FMAIN formed in an orderly line by the protruding portion with curved surface 31. In other words, the flow of traveling air is prevented from flowing back to the insides of the front tires 1L, 1R and into the front wheel houses 14L, 14R.

As described above, in the embodiment 1, a configuration is adopted in which flow redirection is performed by the combination of the protruding portion with curved surface 31 formed on the front undercover 3 and the pair of left and right front deflectors 8L, 8R. Therefore, a flow of traveling air received by the pair of left and right front deflectors 8L, 8R flows from the first flow redirection surfaces 8d toward the main streamline flux FMAIN and smoothly joins the main streamline flux FMAIN formed in an orderly line by the protruding portion with curved surface 31. Thus, the air drag D caused by the front underfloor and the front tires, while traveling, can be further reduced.

Next, advantageous effects will be described.

The front underfloor structure of the electric vehicle EV of the embodiment 1 can achieve advantageous effects as given below.

(1) There is provided a front underfloor structure of a vehicle (the electric vehicle EV), including a protruding member protruding downward from a front underfloor surface of the vehicle, which redirects a flow of traveling air that flows around a front underfloor while traveling, wherein the protruding member is configured as a protruding member with curved surface (the protruding portion with curved surface 31) disposed at a position closer to the vehicle front than front tires 1L, 1R and in a central portion of the front underfloor straddling a vehicle center line CL. In addition, the protruding member with curved surface (the protruding portion with curved surface 31) has a circumference of protrusion in a vehicle longitudinal direction that is longest at the position of the vehicle center line CL, and the circumference of protrusion in the vehicle longitudinal direction becomes gradually shorter with increasing distance from the vehicle center line CL on both sides in a vehicle width direction.

This enables reducing the air drag D produced by a flow of traveling air that flows around the front underfloor while traveling, thereby achieving desired improvements in aerodynamic characteristics.

(2) The protruding member with curved surface (the protruding portion with curved surface 31) has an external configuration having an oval shape having a dimension WL in the vehicle width direction as a major axis and a dimension SL in the longitudinal direction as a minor axis, and has the shape of a protruding curved surface configured as a spherical three-dimensional shape formed by gathering similar arc linear elements that become gradually shorter in length in a direction from the vehicle center line CL toward both sides in the vehicle width direction while the longest arc linear element is set at the position of the vehicle center line CL.

Thus, the protruding member with curved surface (the protruding portion with curved surface 31) has the oval shape to thus reduce a set length in the vehicle longitudinal direction, and also has the spherical three-dimensional shape to thus ensure a smooth flow of traveling air in a smooth streamline, thereby enabling suppression of a divergent flow of the traveling air in the vehicle width direction.

(3) A front undercover 3 is disposed in such a way as to cover a front underfloor region between the pair of left and right front tires 1L, 1R, and the protruding member with curved surface is configured as a protruding portion with curved surface 31 molded integrally with the front undercover 3.

Thus, the vehicle provided beforehand with the front undercover 3 can be provided with the protruding portion with curved surface 31 that achieves the flow redirection function for suppressing a divergent flow of traveling air in the vehicle width direction, without having to increase a parts count.

(4) The front undercover 3 has an inclined portion 3a inclined downward from a front end portion of the vehicle toward the vehicle rear, and the protruding portion with curved surface 31 is disposed at the position of the inclined portion 3a of the front undercover 3.

Thus, the inclination increases the frontal projected area of the protruding portion with curved surface 31 and thus suppresses the occurrence of burble in a flow of traveling air that flows along the protruding portion with curved surface 31, thereby enabling reliable control of flow velocity and hence effective suppression of a divergent flow of the traveling air in the vehicle width direction.

(5) A pair of left and right front deflectors 8L, 8R are disposed forward of the pair of left and right front tires 1L, 1R, respectively, the pair of left and right front deflectors configured such that, when struck by air traveling from the vehicle front, the pair of left and right front deflectors 8L, 8R redirect a flow of the traveling air toward a region below the central portion of the front underfloor centered on the vehicle center line CL, and the protruding portion with curved surface 31 is located at a position closer to the vehicle front than the pair of left and right front deflectors 8L, 8R.

Thus, the protruding portion with curved surface 31 that forms the main streamline flux FMAIN in an orderly line, and the pair of left and right front deflectors 8L, 8R are used in combination, and thereby, a flow of traveling air that flows back toward the region below the central portion of the front underfloor can smoothly join the main streamline flux FMAIN.

Although the front underfloor structure of the vehicle of the present invention has been described above with reference to the embodiment 1, it is to be understood that a specific configuration is not limited to the embodiment 1, and design changes and additions and the like could be made thereto without departing from the spirit and scope of the invention as defined in the appended claims.

In the embodiment 1, an example is given in which the protruding member with curved surface is configured as the protruding portion with curved surface 31 molded integrally with the front undercover 3. However, for example, the protruding member with curved surface as an independent flow redirection part may perform flow redirection around the front underfloor, regardless of the presence or absence of the front undercover or the presence or absence of the front deflectors.

In the embodiment 1, an example is given in which the protruding portion with curved surface 31 has the external configuration having the oval shape, and has the shape of the protruding curved surface configured as the spherical three-dimensional shape. However, the external configuration of the protruding portion with curved surface 31 and the shape of the protruding curved surface are not limited to the shapes of the embodiment 1, and the protruding portion with curved surface or the protruding member with curved surface having various shapes may be adopted. For example, the protruding portion with curved surface or the protruding member with curved surface may be shaped like a wing of a plane, or may be otherwise shaped.

In the embodiment 1, an example is given in which the protruding portion with curved surface 31 is disposed at the position of the inclined portion 3a of the front undercover 3. However, for example, the protruding portion with curved surface or the protruding member with curved surface may be disposed in a flat surface portion of the front underfloor, and the protruding portion with curved surface or the protruding member with curved surface may be set in an inclined position so as to suppress burble in a flow of traveling air.

In the embodiment 1, an example is given in which a flow of traveling air that flows around the front underfloor is redirected by the combination of the protruding portion with curved surface 31 of the front undercover 3 and the pair of left and right front deflectors 8L, 8R. However, the flow of traveling air around the front underfloor may be redirected only by the front undercover having the protruding portion with curved surface, without the front deflectors. Also, the flow of traveling air around the front underfloor may be redirected only by the protruding member with curved surface as the independent flow redirection part, without the front undercover and the front deflectors.

In the embodiment 1, an example is given in which the front underfloor structure is applied to the electric vehicle EV. However, the present invention, of course, may be applied to the front underfloor structure of an electric vehicle such as a hybrid vehicle or a fuel cell vehicle, or may also be applied to the front underfloor structure of an engine driven vehicle. Incidentally, when the present invention is applied to the electric vehicle, battery cruising range is extended, so that an improvement in electric efficiency can be achieved. When the present invention is applied to the engine driven vehicle, an improvement in fuel efficiency can be achieved.

This application is based upon and claims the benefit of priority of the prior Japanese Patent Application No. 2010-89339, filed on Apr. 8, 2010, the entire content of which is incorporated herein by reference.

INDUSTRIAL APPLICABILITY

In the present invention, the protruding member with curved surface is disposed at the position closer to the vehicle front than the front tires and in the central portion of the front underfloor straddling the vehicle center line, taking it into account that traveling air flowing in from the vehicle front flows toward the vehicle rear, diverging in the vehicle width direction. The protruding member with curved surface has the circumference of protrusion in the vehicle longitudinal direction that is longest at the position of the vehicle center line, and the circumference of protrusion in the vehicle longitudinal direction becomes gradually shorter with increasing distance from the vehicle center line on both sides in the vehicle width direction. Thus, in the protruding member with curved surface, the velocity of flow of traveling air is highest at the position of the vehicle center line, and the pressure of the traveling air is lowest at the position of the vehicle center line. Then, in the protruding member with curved surface, the velocity of flow of traveling air becomes gradually lower and the pressure of the traveling air becomes gradually higher with increasing distance from the vehicle center line on both sides in the vehicle width direction. The protruding member with curved surface controls the flow velocity and the pressure thereby to deflect and redirect a flow of traveling air that is diverging in the vehicle width direction while flowing toward the vehicle rear, back to the region below the central portion of the front underfloor, thus suppressing a divergent flow of the traveling air in the vehicle width direction. In this manner, the protruding member with curved surface serves the flow redirection function for suppressing a divergent flow of traveling air in the vehicle width direction, at the position of the front underfloor, thereby to reduce the rate of flow of traveling air into the regions of the pair of left and right front tires where air drag is mainly caused on the front underfloor. Therefore, this enables reducing air drag produced by a flow of traveling air that flows around the front underfloor while traveling, thereby achieving desired improvements in aerodynamic characteristics.

REFERENCE SIGNS LIST

EV electric vehicle (as an example of a vehicle)
1L, 1R a pair of left and right front tires
2L, 2R a pair of left and right rear tires
3 front undercover
3a inclined portion
31 protruding portion with curved surface (or protruding member with curved surface)
4 motor room rear undercover
5 first battery undercover
6 second battery undercover
7 rear undercover
8L, 8R a pair of left and right front deflectors
8a front apex portion
8b inner end portion
8c outer end portion
8d first flow redirection surface
8e second flow redirection surface
8e1 curved flow redirection surface
8e2 flat flow redirection surface
9L, 9R a pair of left and right rear deflectors
TFR leading edge surface of tire when straight
TIN inner surface of tire when straight
CL vehicle center line
θ divergent angle
F tire streamline flux
FIN vehicle inside streamline flux
FOUT vehicle outside streamline flux
FMAIN main streamline flux of traveling air
WL dimension in vehicle width direction
SL dimension in longitudinal direction

The invention claimed is:

1. A front underfloor structure of a vehicle, comprising a protruding member protruding downward from a front underfloor surface of the vehicle and being configured to redirect a flow of traveling air that flows around a front underfloor while traveling, wherein
the protruding member is configured as a protruding member with curved surface disposed at a position closer to the vehicle front than front tires and in a central portion of the front underfloor straddling a vehicle center line, and
the protruding member with curved surface has a shape of a protruding curved surface, the shape of the protruding curved surface has a circumference of a surface in a vehicle longitudinal direction that is longest at the position of the vehicle center line and becomes gradually shorter with increasing distance from the vehicle center line on both sides in a vehicle width direction.

2. The front underfloor structure of the vehicle, according to claim 1, wherein
the protruding member with curved surface has an external configuration having an oval shape having a dimension in the vehicle width direction as a major axis and a dimension in the longitudinal direction as a minor axis, and has the shape of the protruding curved surface configured as a spherical three-dimensional shape formed by gathering similar arc linear elements that become gradually shorter in length in a direction from the vehicle center line toward both sides in the vehicle width direction while the longest arc linear element is set at the position of the vehicle center line.

3. The front underfloor structure of the vehicle, according to claim 1, wherein
a front undercover is disposed in such a way as to cover a front underfloor region between the pair of left and right front tires, and
the protruding member with curved surface is configured as a protruding portion with curved surface molded integrally with the front undercover.

4. The front underfloor structure of the vehicle, according to claim 3, wherein
the front undercover has an inclined portion inclined downward from a front end portion of the vehicle toward the vehicle rear, and
the protruding portion with curved surface is disposed at the position of the inclined portion of the front undercover.

5. The front underfloor structure of the vehicle, according to claim 4, wherein
a pair of left and right front deflectors are disposed forward of the pair of left and right front tires, respectively, the pair of left and right front deflectors configured such that, when struck by air traveling from the vehicle front, the pair of left and right front deflectors redirect a flow of the traveling air to a flow of air passing below the central portion of the front underfloor centered on the vehicle center line, and
the protruding portion with curved surface is disposed at a position closer to the vehicle front than the pair of left and right front deflectors.

* * * * *